O. P. STALEY.
BEVEL GAGE.
APPLICATION FILED JUNE 1, 1908.
925,962.
Patented June 22, 1909.
2 SHEETS—SHEET 1.
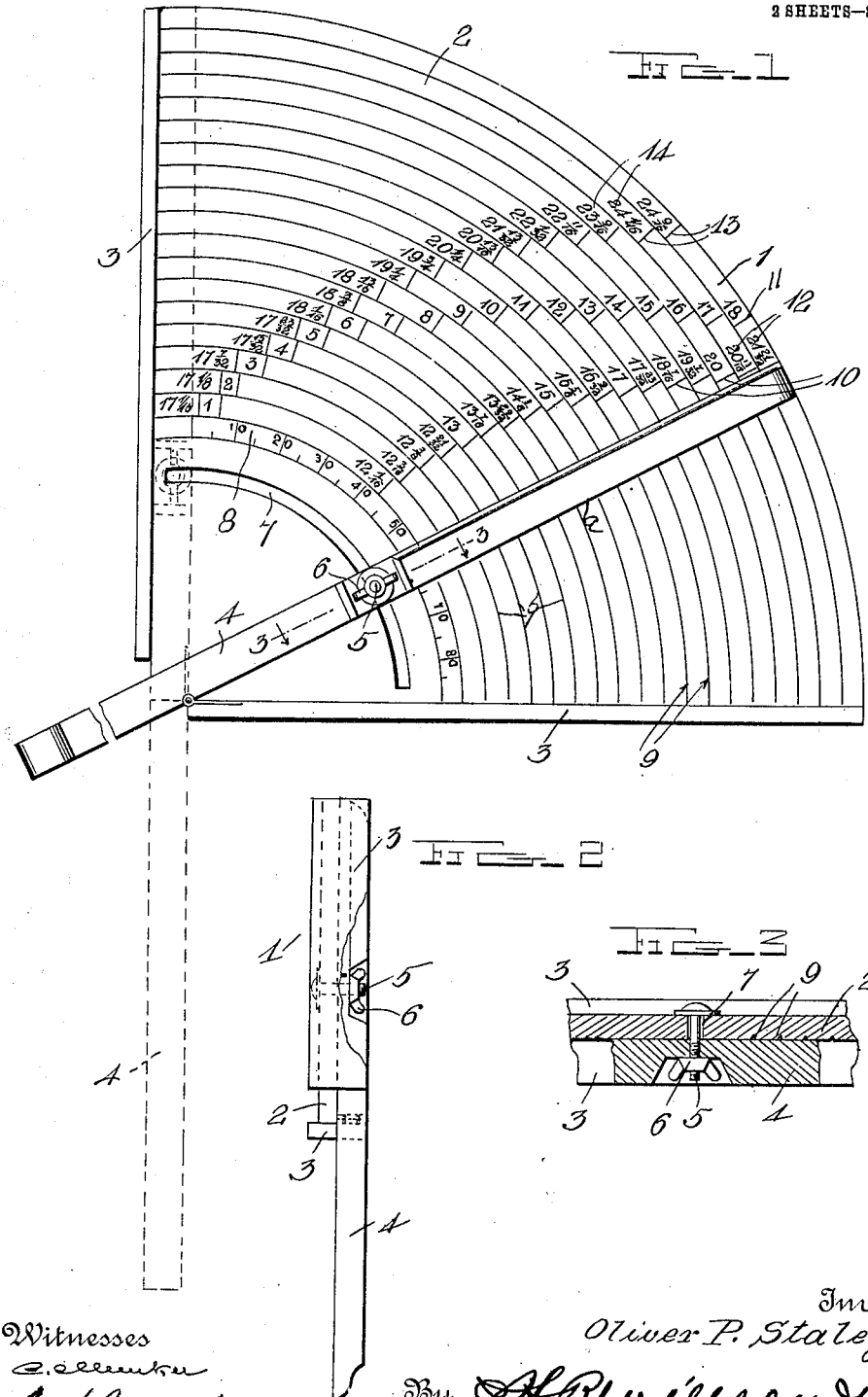
Witnesses
C. H. Griesbauer
Inventor
Oliver P. Staley
By H. B. Willson & Co.
Attorneys

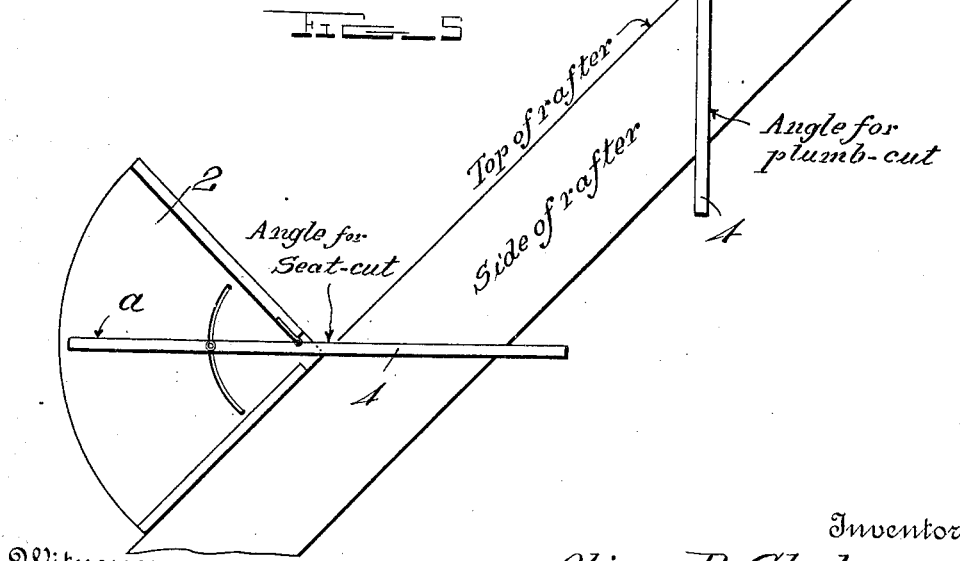

UNITED STATES PATENT OFFICE.

OLIVER P. STALEY, OF CRESTON, IOWA.

BEVEL-GAGE.

No. 925,962.   Specification of Letters Patent.   Patented June 22, 1909.

Application filed June 1, 1908. Serial No. 435,924.

*To all whom it may concern:*

Be it known that I, OLIVER P. STALEY, a citizen of the United States, residing at Creston, in the county of Union and State of Iowa, have invented certain new and useful Improvements in Bevel-Gages; and I do declare the following to be a full, clear, and exact description of the invention, such as will enable others skilled in the art to which it appertains to make and use the same.

This invention relates to improvements in bevel gages.

The object of the invention is to provide a device of this character having means by which the pitch or rise and the bevel or angle of the cut of rafters may be readily determined.

A further object is to provide a bevel gage having thereon scales of measurement by means of which the length of the rafters may be determined for various pitches of rises.

With these and other objects in view, the invention consists of certain novel features of construction, combination and arrangement of parts as will be described and particularly pointed out in the appended claims.

In the accompanying drawings, Figure 1 is a plan view of the gage showing the bar or blade in an inoperative position in dotted lines, and in an operative position in full lines; Fig. 2 is an edge view of the same; Fig. 3 is a sectional view on the line 3—3 of Fig. 1; Fig. 4 is a diagrammatic plan view showing the manner in which the gage is arranged for indicating the angle for cutting the end of jack rafters to fit against a hip rafter; and Fig. 5 is a similar view showing the application of the gage for indicating the angle for forming the plumb and seat cuts for hip, jack and common rafters.

Referring more particularly to the drawings, 1 denotes the gage which consists of a segmental dial plate, 2, having right-angularly disposed side edges on which are formed side plates, 3, which project above and below the dial plate, as shown. Pivotally connected to one of the side plates, 3, adjacent to the corner formed by the right-angularly disposed side edges of the dial plate, is a gage bar or blade, 4, which projects entirely across the upper side of the dial plate and is extended a considerable distance beyond the corner of the plate to provide a straight edge for the purpose of marking off the angles or bevels for the cuts of the rafters.

The portion of the gage bar which projects over the dial plate is beveled on one edge to facilitate the use of the same in connection with the markings on the dial plate. In order that the gage bar may be secured in position after being adjusted on the dial plate when ascertaining a certain pitch or rise, I provide a suitable locking mechanism which is here shown and is preferably in the form of a clamping bolt, 5, and nut, 6. The bolt, 5, passes through the gage bar and is adapted to work in a segmental slot, 7, in the plate, 2, and on the upper end of the bolt, 5, is arranged the clamping nut, 6. The gage bar is preferably cut away or recessed at the point where the bolt passes through the same so that the end of the bolt and the nut will be countersunk and will not project above the upper face of the gage bar or the upper edges of the side plates, 3, on the square sides of the dial plate, thus permitting the instrument to be laid flat. The thickness of the gage bar is preferably equal to the height of the side plates, 3, above the dial plate, as shown. The lower edges of the side plates 3 project a sufficient distance below the dial plate to prevent the head of the bolt from engaging the surface with which this side of the instrument may be engaged. The bolt, 5, is preferably provided with a washer, 8, arranged between the head of the bolt and the under side of the dial plate.

On the upper side of the dial plate, adjacent to the slot, 7, is arranged a scale of degrees, 8, representing the degrees of a circle, and beyond the degree marks, 8, the plate is divided by concentrically arranged grooves, 9, into a series of concentric spaces, in which are arranged graduations and scales of measurement representing various rises or pitches for rafters as well as the lengths and the angle or bevel for forming the cuts of the rafters for various rises. The spaces between the grooves 9 are numbered from one to eighteen, beginning from the inner space. Said numbers represent the rise in inches of the rafters for each foot of run.

In the spaces between the grooves, 9, is arranged a series of degree marks, 10, which indicate the angle or bevel for the cuts of jack rafters to fit against the hip rafters. The arrangement of the gage for forming these cuts is illustrated in Fig. 4 of the drawings. The degree marks, 11, indicate the bevel or angle for forming the top or plumb cuts and the bottom or seat cuts of common, jack and hip rafters. The arrangement of the gage for this purpose is shown in Fig. 5 of the drawings. In the space opposite the degree marks, 10, is placed a series of numbers, 12, which designate the length in inches for jack and common rafters for each foot of run. The numbers opposite the degree marks 11 indicate the rise in inches or the perpendicular for every foot of base or run. On the dial plate in the space between the grooves, 9, is also arranged a series of degree marks, 13, which indicate the angle or bevel for the cuts of hip and valley rafters at various rises per foot of run, and opposite the degree marks, 13, is arranged a series of numbers or scale of measurements, 14, which designate the length in inches for each foot of run of the hip and valley rafters.

In using the instrument, assuming that it is desired to frame in the roof of a building six feet wide, and that the roof is to have a rise of nine inches to the foot, to determine the length of the rafter and the angle for cutting the ends of the same, the gage bar, is set on the dial plate so that the working edge, a, of the bar is in line with the degree mark, 10, in the space numbered nine on the dial plate. This position of the gage bar in connection with the right and left-hand straight edge of the dial plate when applied to a rafter will indicate thereon the angle at which the top or plumb cut and the bottom or seat cuts are to be made. To mark the top or plumb cuts on the rafter after thus adjusting the gage bar, the right side edge of the dial plate is engaged with the upper or top face of the rafter adjacent to its upper end so that the extension of the gage bar projects across one side of the rafter and forms a straight edge by means of which the mark may be made for forming the top or plumb cut, as is plainly indicated in Fig. 5 of the drawing.

To form the bottom or seat cut at the lower end of the rafter, the left side edge of the dial plate is engaged with the upper or top face of the rafter so that the extension of the blade or bar projects across the side of the rafter in a direction opposite to the mark formed at the upper end and thus provides for the marking of the bottom cut, as is clearly shown in Fig. 5 of the drawing.

To ascertain the length of the rafter or the points at which the bottom cut is made, it is simply necessary to observe the number opposite to the degree mark, 10, in the space, 9, which will be found to be 15. This number represents the length in inches for each foot or run of the rafter, which, in this instance we know to be three feet, or one-half the width of the building. By employing the number 15 which represents the length for one foot of run by the total number of feet, which is three, we find the entire length of the rafter to be forty-five inches, so that it is simply necessary to measure on the rafter forty-five inches from the outside corner of the top or plumb cut, which will give the point at which the lower or seat cut is to be made.

The description of the operation just given is for obtaining the length of the rafter and the angle for making the cuts of jack and common rafters. To obtain the length and angle for cutting hip and valley rafters, the same operation is followed, employing the degree marks 13 and the scale of numbers, 14, which are laid out on the dial plate in proper position for this purpose.

By means of an instrument of this character, an ordinary carpenter without knowledge of mechanical calculations, may accurately obtain the length, pitch and cuts for all forms of rafters, and by means of the instrument these operations are greatly facilitated.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. In a bevel gage, a segmental dial plate having arranged thereon a series of concentric grooves to form spaces in which is arranged a series of numbers to indicate the rise in inches for each foot of run, and a series to indicate the length of various forms of rafters, and a series of degree marks indicating the angle for forming the cuts of the rafters, a gage bar pivotally mounted on said dial plate to co-act with said degree marks, said bar extending across the plate and projecting beyond the same to provide a straight edge for indicating the angle for the cut when the gage is applied to a rafter, and means to clamp said gage bar in its adjusted position on the dial plate.

2. In a bevel gage, a segmental dial plate having formed therein a segmental slot and having on its upper surface a series of grooves forming concentric spaces adapted to contain numbers or scales and degree marks for determining the length, the rise per foot of the base, and the angle for forming the cuts of various rafters, side plates formed on the right and left-hand edges of the dial plate, said side plates projecting above and below the dial plate, a gage bar pivotally connected to one of said side plates adjacent to the right-angular corner of the dial plate to co-act with the degree marks on the dial plate, said gage bar projecting across the dial plate and extending beyond the same to form a straight edge to co-act with said right and left-hand side plates when applied to a rafter whereby the angle indicated by the degree mark adjacent to the inner end of the bar may be indicated on the rafter, and a clamping bolt and nut arranged in said gage bar and in the slot in the dial plate to secure said bar in its adjusted position.

In testimony whereof I have hereunto set my hand in presence of two subscribing witnesses.

OLIVER P. STALEY.

Witnesses:
 MARY T. KELLY,
 JOHN McDONALD.